United States Patent
Yoon et al.

(10) Patent No.: US 6,859,314 B2
(45) Date of Patent: Feb. 22, 2005

(54) REAR PROJECTION SCREEN AND PROJECTOR ADOPTING THE SAME

(75) Inventors: Seok-il Y Yoon, Daejeon Maetropolitan (KR); Gyu-hwan Hwang, Hwaseong-gun (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 10/684,814

(22) Filed: Oct. 15, 2003

(65) Prior Publication Data

US 2004/0136065 A1 Jul. 15, 2004

(30) Foreign Application Priority Data

Oct. 15, 2002 (KR) .................... 10-2002-0062696

(51) Int. Cl.[7] .................... G03B 21/60; G03B 21/56; G02B 27/02
(52) U.S. Cl. .................... 359/452; 359/443; 359/460; 359/457; 359/453
(58) Field of Search .................... 359/449, 452, 359/443, 453, 455–457, 459, 460; 353/28, 74–80, 122

(56) References Cited

U.S. PATENT DOCUMENTS

| | | | | |
|---|---|---|---|---|
| 3,609,000 A | * | 9/1971 | Miyano et al. | 359/453 |
| 3,612,650 A | * | 10/1971 | Miyano et al. | 359/452 |
| 6,088,158 A | * | 7/2000 | Kimura | 359/443 |
| 6,318,868 B1 | * | 11/2001 | Larussa | 359/857 |
| 6,665,118 B2 | * | 12/2003 | Yamaguchi et al. | 359/453 |

* cited by examiner

*Primary Examiner*—Judy Nguyen
*Assistant Examiner*—Andrew Sever
(74) *Attorney, Agent, or Firm*—Sughrue Mion, PLLC

(57) ABSTRACT

A screen for a projector includes a Fresnel lens which concentrates incident light, a lenticular lens arranged on a front surface of the Fresnel lens and which forms an image by focusing light passing through the Fresnel lens, a protective panel installed on a front surface of the lenticular lens and which protects the lenticular lens, and a reflection reducing portion formed on one surface of the protective panel, wherein the reflection reducing portion reduces reflection of light by diffusely reflecting the light, and wherein the reflection reducing portion includes a core member capable of being emitted externally.

6 Claims, 5 Drawing Sheets

REAR PROJECTION SCREEN AND PROJECTOR ADOPTING THE SAME

BACKGROUND OF THE INVENTION

This application claims the priority of Korean Patent Application No. 2002-62696 filed Oct. 15, 2002 in the Korean Intellectual Property Office, the disclosure of which is incorporated herein in its entirety by reference.

1. Field of the Invention

The present invention relates to a rear projection screen and a projector adopting the same, and more particularly, to a rear projection screen which can reduce reflection of external light and emit functional substance to an audiovisual space, and a projector adopting the same.

2. Description of the Related Art

In general, projectors provide images by generating the image in an image forming unit and projecting the same onto a screen. The projectors are classified into front projection projectors and rear projection projectors according to the method of magnifying and projecting an image onto a screen.

Referring to FIG. 1, a typical rear projection projector includes a cabinet 10, a screen 20 installed on the front surface of the cabinet 10 and where an image is formed, an image forming unit 11, such as a cold CRT, installed in the cabinet 10 and generating and projecting an image, a projection lens unit 13 magnifying and projecting the image emitted by the image forming unit 11, and a reflection mirror 15 reflecting the image input from the projection lens unit 13 toward the screen 20. In the rear projection projector having the above structure, an image projected in the rear of the screen 20 and formed on the screen 20 is viewed in front of the screen 20, that is, outside the cabinet 10.

Referring to FIG. 2, the conventional rear projection screen 20 includes a Fresnel lens 21 concentrating a divergent light input from the projection lens unit 13 to be a parallel beam, a lenticular lens 23 arranged on a front surface of the Fresnel lens 21 and forming an image by focusing light passing through the Fresnel lens 21, and a protective panel 25 installed on a front surface of the lenticular lens 23.

The protective panel 25 protects the Fresnel lens 21 and the lenticular lens 23 from scratching and contamination and is used to improve contrast of an image. Meanwhile, when an external light source is present and an audiovisual space is bright, the protective panel 25 causes a surface reflection with respect to an external light so that the quality of an image is deteriorated.

In consideration of the above problem, the subject applicant filed Korean Patent Application No. 98-28422 on 14 Jul. 1998. According to the Korean application, as shown in FIG. 3, the protective panel 25 includes an external light reflection reducing portion 27 which can reduce reflection of light input from an external light source installed outside a projector. The external light reducing portion 27 changes a reflection angle of the light input from the external light source and makes the light diffusively reflected, so that reflection light proceeding toward a viewer is reduced.

However, this projection screen has no additional function other than the external light reflection reduction.

SUMMARY OF THE INVENTION

To solve the above and other problems, the present invention provides a rear projection screen in which the structure of the protective panel is improved to reduce deterioration of the image quality of the screen by reducing reflection of the external light. Further, the protective panel includes a functional substance and emits the functional substance externally.

According to an aspect of the present invention, a screen for a projector comprises: a Fresnel lens which concentrates incident light; a lenticular lens arranged on a front surface of the Fresnel lens and which forms an image by focusing light passing through the Fresnel lens; a protective panel installed on a front surface of the lenticular lens and which protects the lenticular lens; and a reflection reducing portion formed on one surface of the protective panel, wherein the reflection reducing portion reduces reflection of external light by diffusely reflecting the external light and wherein the reflection reducing portion includes a core member capable of being emitted externally.

The reflection reducing portion comprises a plurality of hollow fillers which diffusely reflect external light, a core member filling the hollow fillers and which is capable of being emitted to the outside, and a coupling member which couples the hollow fillers to the protective panel.

According to another aspect of the present invention, there is a projector including an image forming apparatus which generates an image, a projection lens unit which magnifies and projects the generated image, and a screen where the image projected by the projection lens unit is formed. Further, the screen comprises a Fresnel lens which concentrates incident light, a lenticular lens arranged on a front surface of the Fresnel lens and which forms an image by focusing light passing through the Fresnel lens, a protective panel installed on a front surface of the lenticular lens and which protects the lenticular lens, and a reflection reducing portion formed on one surface of the protective panel, wherein the reflection reducing portion reduces the reflection of light by diffusely reflecting the light, and wherein the reflection reducing portion includes a core member capable of being emitted externally.

BRIEF DESCRIPTION OF THE DRAWINGS

The above and other features of the present invention will become more apparent by describing in detail exemplary embodiments thereof with reference to the attached drawings, in which.

DETAILED DESCRIPTION OF THE INVENTION

The present invention will now be described more fully with reference to the accompanying drawings in which illustrative, non-limiting embodiments of the invention are shown.

Figure 1:
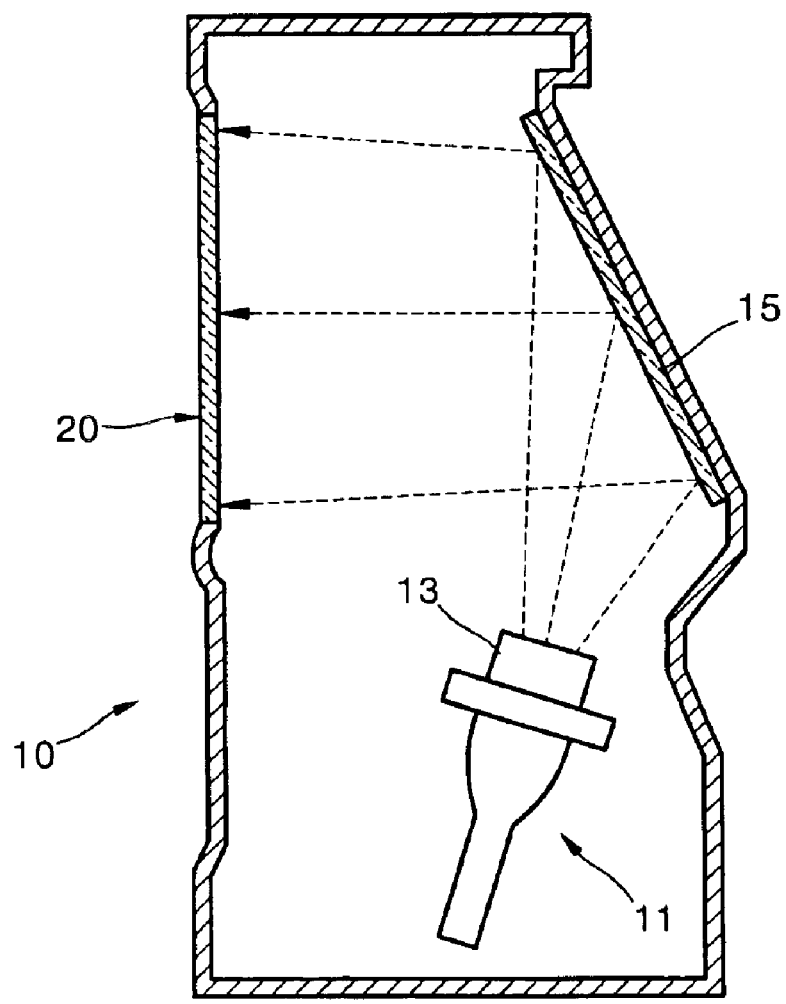
FIG. 1 is a sectional view illustrating a conventional general rear projection projector.
Figure 2:
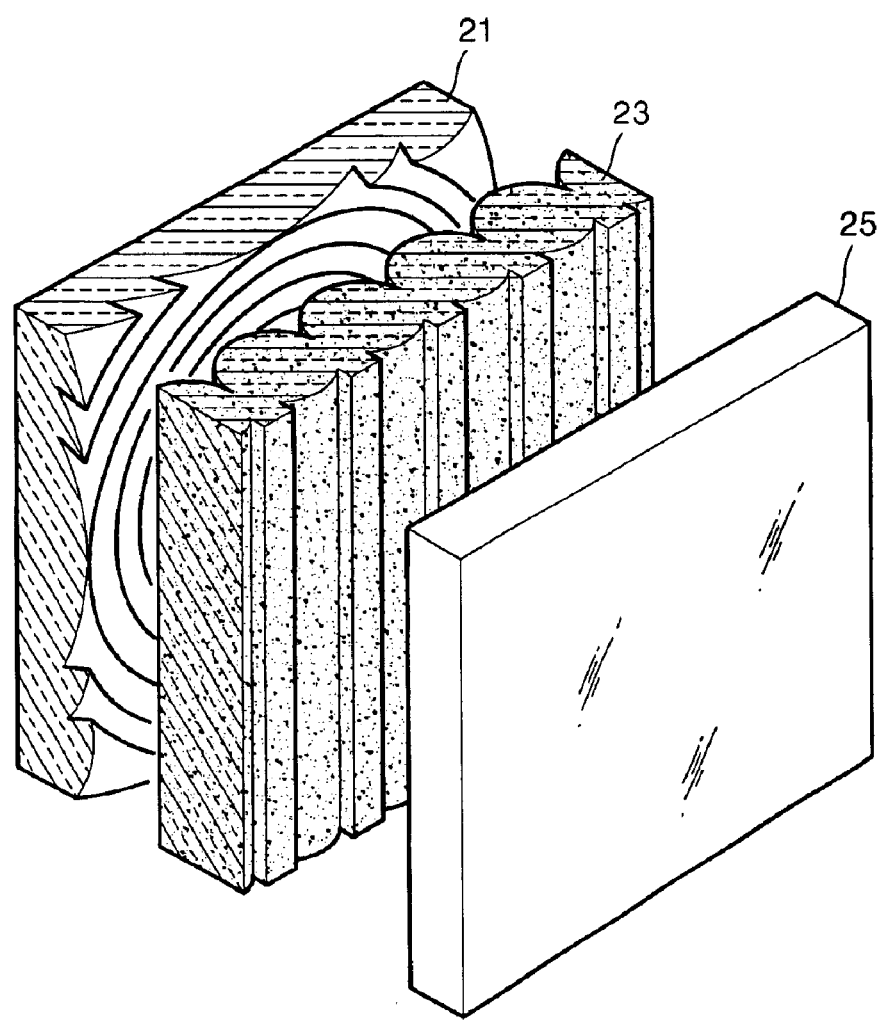
FIG. 2 is a perspective view illustrating a conventional rear projection screen.
Figure 3:
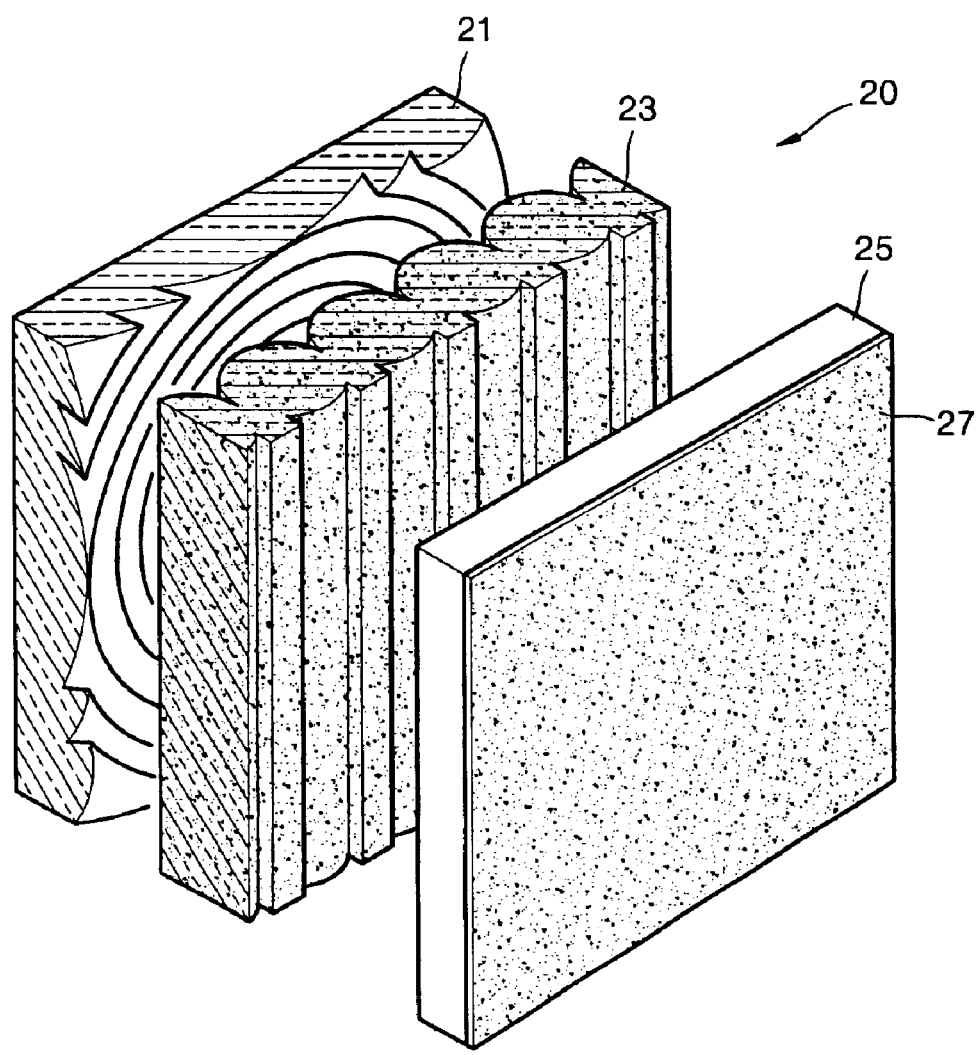
FIG. 3 is a perspective view illustrating a conventional protective panel to reduce reflection of the external light.
Figure 4:
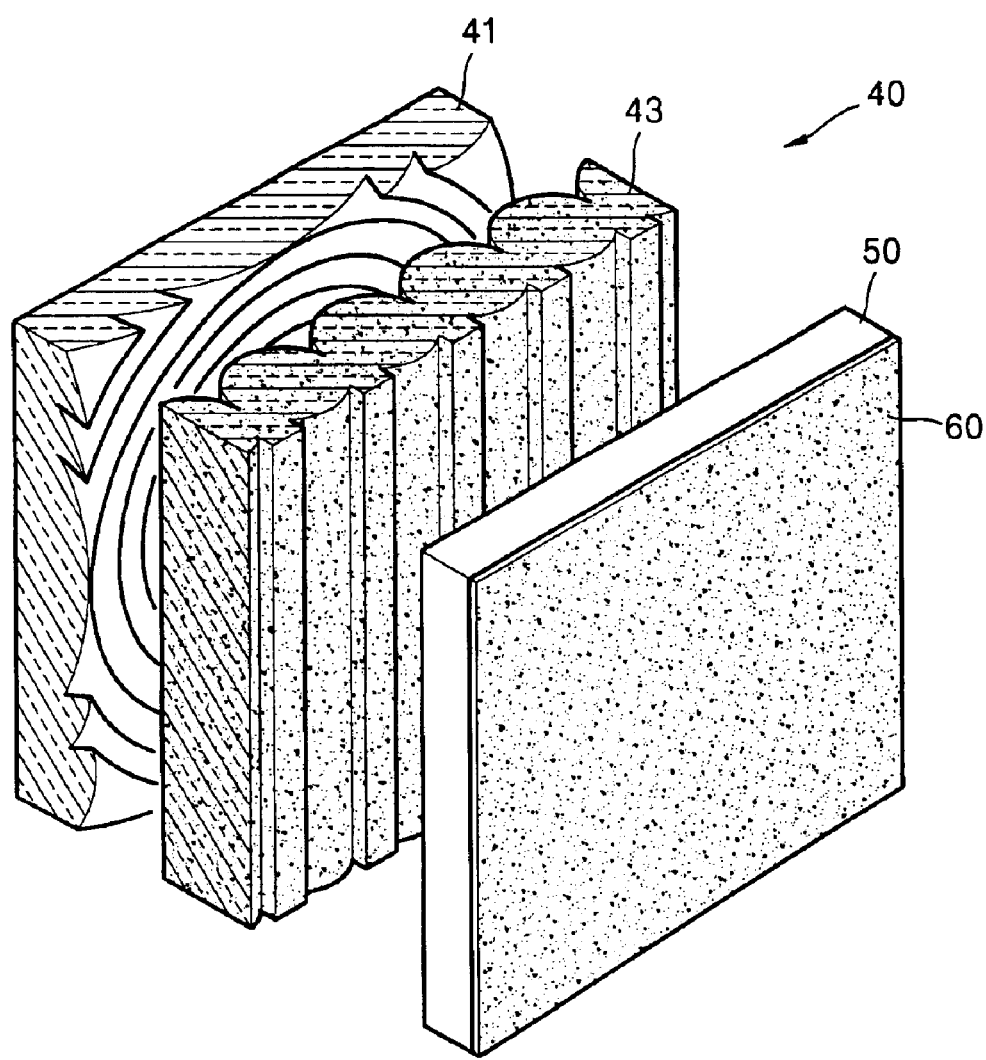
FIG. 4 is a perspective view illustrating a rear projection screen according to an embodiment of the present invention.

Referring to FIG. 4, a rear projection screen 40 according to an embodiment of the present invention includes a Fresnel lens 41 which concentrates divergent light, input from the projection lens unit 13 of FIG. 1, into a parallel beam, a lenticular lens 43 arranged on a front surface of the Fresnel lens 41 and which forms an image by focusing light passing through the Fresnel lens 41, a protective panel 50 installed on a front surface of the lenticular lens 43 and which protects the Fresnel lens 41 and the lenticular lens 43, and a reflection reducing portion 60 formed on one surface of the protective panel 50. The reflection reducing portion 60 reduces reflection of light input from an external light source 30 of FIG. 5 and simultaneously emits a functional substance.

The reflection reducing portion 60 reduces light reflected to a viewer by diffusely reflecting the light from external light source 30. Further, by way of example, the functional substance comprises at least one of medical supplies, an aromatic, oil, and an antibiotic and is emitted externally for a long period of time. Thus, the reflection reducing portion 60 not only provides a quality image but also treatment and a favorable viewing environment to a viewer.

Figure 5:
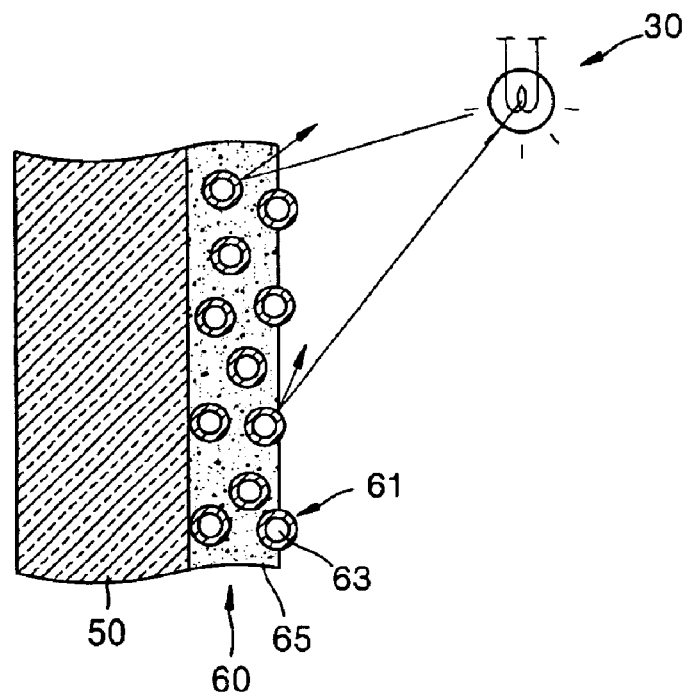
FIG. 5 is a sectional view illustrating a reflection reducing portion according to an embodiment of the present invention.
Figure 6:
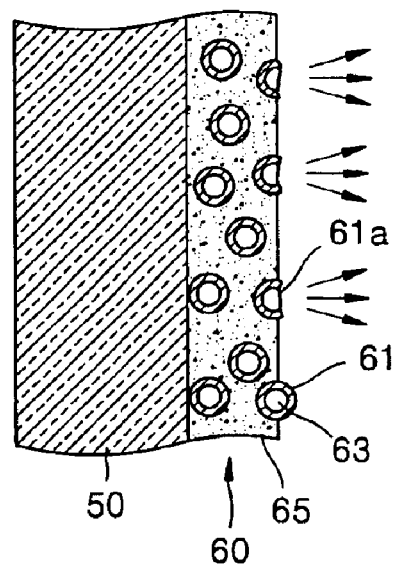
FIG. 6 is a sectional view for explaining the operation of the reflection reducing portion of FIG. 5.

Referring to FIGS. 5 and 6, the reflection reducing portion 60 includes a plurality of hollow fillers 61, a core member 63, which fills the hollow fillers 61, and a coupling member 65 coupling the hollow fillers 61 to the protective panel 50.

The hollow fillers 61 are formed either completely embedded in the coupling member 65 or so that part of the hollow fillers 61 are externally exposed. The hollow fillers 61 are rounded at their outer surfaces to be able to diffusively reflect external light. Thus, deterioration of the quality of an image due to the external light can be reduced.

The hollow fillers 61 have a diameter of about 1–300 μm. Preferably, but not necessarily, the hollow fillers 61 have an average diameter of 5–10 μm. As the diameter of the hollow fillers 61 is small, the outer surfaces of the hollow fillers 61 are formed smoothly, and the external light can be effectively, diffusely reflected. Also, the hollow fillers 61 are chosen from a urethane compound, melamine, urea, and a gelatin compound.

By way of example, the core member 63 comprises at least one of medical supplies, an aromatic, oil, and an antibiotic and is emitted from within the hollow fillers 61 to the external environment. Thus, the viewing environment can be improved by aromatic and/or antibiotic functions in the audiovisual space. It should be understood by one of ordinary skill in the art that the core member 63 is not limited to the above-described materials and that any materials capable of performing the above functions may be used therefor.

The core member 63 may be gradually emitted to the outside according to the property thereof as the walls of the hollow fillers 61 disappear, thereby exposing the core member. It also may be emitted through an external stimulus for example, by polishing the hollow fillers 61.

FIG. 6 shows that the hollow fillers 61 are partially open, as indicated by reference numeral 61a. As the hollow fillers 61 are opened, the core member 63 is exposed.

The coupling member 65 couples the hollow fillers 61 to the protective panel 50. The coupling member 65 may be formed on the protective panel 50 in a coating method such as flow coating, dip coating, or roll coating. Since these coating methods are well known, detailed descriptions thereof will be omitted.

The coating method used may be selected based on the type of resin forming the coupling member and by the properties of the hollow fillers 61. The above-described coating methods for forming the coupling member 65 are merely exemplary, and other methods may also be used.

Table 1 shows an example of adopting the hollow fillers 61 according to an exemplary embodiment of the present invention, with respect to a 43 inch screen having a ratio of 4:3.

TABLE 1

| Volume (mm$^3$) | Surface resistance (Ω) | Gloss value | Core member |
|---|---|---|---|
| 901 × 692 × 2 | 10$^{12}$ | ~110 ± 30 | olive oil |

Table 1 shows an example using olive oil, in which it can be seen that reflection of the external reflection is lowered as the item "Gloss value" has 110±30 among standard values between 0 and 160.

A projector according to the present invention includes an image forming unit which generates an image, a projection lens which magnifies and projects the generated image, and a screen where the image is formed. The rear projection screen described with reference to FIGS. 4 through 6, is used for the screen in this embodiment.

As described above, the rear projection screen having the structure according to the present invention, and the projector adopting the same, provides a clear image by reducing reflection of the external light through diffused reflection by the hollow fillers. Also, since the core members filling the hollow fillers are emitted to an audiovisual space, effects such as aromatic, antibiotic, and treatment functions can be obtained.

Although the above embodiments of the present invention have been described, it will be understood by those skilled in the art that the present invention should not be limited to the described exemplary embodiments, but that various changes and modifications can be made within the spirit and scope of the present invention. Accordingly, the scope of the present invention is not limited to the described range of the following claims.

What is claimed is:

1. A screen for a projector comprising:
    a Fresnel lens concentrating incident light;
    a lenticular lens arranged on a front surface of the Fresnel lens and forming an image by focusing light passing through the Fresnel lens;
    a protective panel installed on a front surface of the lenticular lens and protecting the lenticular lens; and
    an external light reflection reducing portion formed on one surface of the protective panel and reducing reflection of light proceeding toward a viewer by making external light input from outside the projector diffusively reflected and including a core member comprising a substance capable of being emitted to the outside.

2. The screen as claimed in claim 1, wherein the external light reflection reducing portion comprises:
    a plurality of hollow fillers making incident external light diffusively reflected;
    a core member filling the hollow fillers and capable of being emitted to the outside; and
    a coupling member coupling the hollow fillers to the protective panel.

3. The screen as claimed in claim 2, wherein the core member is made of at least one material selected from a group consisting of medical supplies, an aromatic, oil, and an antibiotic.

4. A projector including an image forming apparatus generating an image, a projection lens unit magnifying and projecting the generated image, and a screen where the image projected by the projection lens unit is formed, wherein the screen comprises:

a Fresnel lens concentrating incident light;

a lenticular lens arranged on a front surface of the Fresnel lens and forming an image by focusing light passing through the Fresnel lens;

a protective panel installed on a front surface of the lenticular lens and protecting the lenticular lens; and an external light reflection reducing portion formed on one surface of the protective panel and reducing reflection of light proceeding toward a viewer by making external light input from outside the projector diffusively reflected and including a core member comprising a substance capable of being emitted to the outside.

5. The projector as claimed in claim 4, wherein the external light reflection reducing portion comprises:

a plurality of hollow fillers making incident external light diffusively reflected;

a core member filling the hollow fillers and capable of being emitted to the outside; and a coupling member coupling the hollow fillers to the protective panel.

6. The projector as claimed in claim 4, wherein the core member is made of at least one material selected from a group consisting of medical supplies, an aromatic, oil, and an antibiotic.

* * * * *